United States Patent [19]

Uchida et al.

[11] Patent Number: 4,805,286

[45] Date of Patent: Feb. 21, 1989

[54] PROCESS FOR ADJUSTING ALIGNMENT OF A SUSPENSION SUB-ASSEMBLY

[75] Inventors: Kuninobu Uchida; Kenji Nemoto; Kunio Nokajima; Nagatoshi Murata; Mitsuo Kaneko, all of Sayama, Japan

[73] Assignee: Honda Giken Kogyo Kabushiki Kaisha, Tokyo, Japan

[21] Appl. No.: 67,072

[22] Filed: Jun. 29, 1987

[30] Foreign Application Priority Data

Jul. 2, 1986 [JP] Japan .................................. 61-154213

[51] Int. Cl.4 ............................................. B23Q 17/00
[52] U.S. Cl. ........................................ 29/407; 29/404; 29/469; 29/705
[58] Field of Search ................. 29/407, 467, 468, 469, 29/428, 705; 73/866.4; 280/688-726; 301/124 R, 125

[56] References Cited

U.S. PATENT DOCUMENTS 3,694,890 10/1972 Arning et al. ......................... 29/428

FOREIGN PATENT DOCUMENTS 71530 5/1985 Japan .

Primary Examiner—Timothy V. Eley
Attorney, Agent, or Firm—Armstrong, Nikaido, Marmelstein & Kubovcik

[57] ABSTRACT

Alignment adjustment apparatus for holding the subsidiary frame of a vehicle suspension sub-assembly and the suspension components in the same position they would assume when attached to and supporting a vehicle body includes sensors for detecting the relative position of wheel mounting members and knuckle arms thereby permitting alignment adjustment relative to previously measured locations of attaching means on a vehicle body to which the suspension sub-assembly is to be attached.

3 Claims, 9 Drawing Sheets 4,805,286

PROCESS FOR ADJUSTING ALIGNMENT OF A SUSPENSION SUB-ASSEMBLY

FIELD OF THE INVENTION

This invention relates to a process and apparatus for adjusting the alignment of a vehicle wheel suspension assembly and, more specifically, to a process and apparatus for adjusting the alignment of a vehicle wheel suspension assembly relative to a vehicle before the suspension assembly is provided or mounted to the vehicle.

BACKGROUND OF THE INVENTION

In the past, as disclosed in Japanese Utility Model Registration Publication Sho 60 (1985)-71530, component parts for a vehicle wheel suspension have been attached to a subsidiary frame in such a manner as to provide a suspension sub-assembly requiring alignment of a predetermined value. The necessary alignment adjustment is made and the resulting sub-assembly is then attached or assembled to a vehicle body on an assembly line.

However, in the foregoing process it is not unusual that the suspension sub-assembly may be attached to the vehicle body in some position other than the desired reference position for the suspension sub-assembly thereby causing a displacement in or deviation from the desired alignment of the wheels relative to the vehicle body and, consequently, it becomes necessary to make a wheel alignment adjustment of the suspension on a completely assembled vehicle. Such an adjustment of the wheel alignment requires the skill and time of an experienced mechanic and must be carried out in a pit beneath the vehicle where the working environment is less than that desired by most experienced mechanics. This imposes some burden and dissatisfaction on the part of the worker and limits to some degree the extend to which productivity may be enhanced on the vehicle assembly line.

The present invention avoids the foregoing problems and difficulties by providing a process and apparatus for properly aligning a suspension assembly relative to a vehicle body before it is assembled to the vehicle body thereby making it unnecessary to make a wheel alignment adjustment of the suspension on a completely assembled vehicle.

SUMMARY OF THE INVENTION

The invention provides a process for adjusting alignment of a suspension sub-assembly having a pair of wheel mounting elements suspended from a subsidiary frame relative to a vehicle body which includes means for attaching the sub-assembly thereto comprising measuring the means for attaching the sub-assembly to the vehicle body, detecting the extend to which the means for attaching the sub-assembly deviates from a reference position, mounting the sub-assembly to apparatus adapted to hold the suspension sub-assembly with the wheel mounting element oriented the same as through the suspension sub-assembly were attached to a vehicle body, and adjusting the orientation of the wheel mounting elements relative to the subsidiary from a to compensate for the extent to which the means for attaching the sub-assembly deviates from the reference position whereby the wheel mounting elements of the adjusted sub-assembly will have a predetermined orientation relative to the vehicle body when the sub-assembly is actually attached to the vehicle body.

The process is also effective for adjusting alignment of a suspension sub-assembly which includes a steering mechanism and in such case the progress includes detecting a neutral position of the steering mechanism and maintaining the steering mechanism at the neutral position during adjustment of the position of said components relative to the subsidiary frame.

The invention also provides apparatus for adjusting alignment of the suspension sub-assembly which includes a machine base, means on the machine base for clamping and holding the subsidiary frame in place, simulation means for setting the suspension components members in the same position relative to the subsidiary frame that the component members would assume if actually attached to a vehicle body, and sensing means for detecting the location and orientation of the wheel mounting elements and suspension component members to permit proper adjustment thereof.

The foregoing features as well as the advantages and benefits of the invention will become apparent from the following description of the preferred embodiment taken in conjunction with the accompanying drawings.

DESCRIPTION OF THE PREFERRED EMBODIMENT

Figure 1:
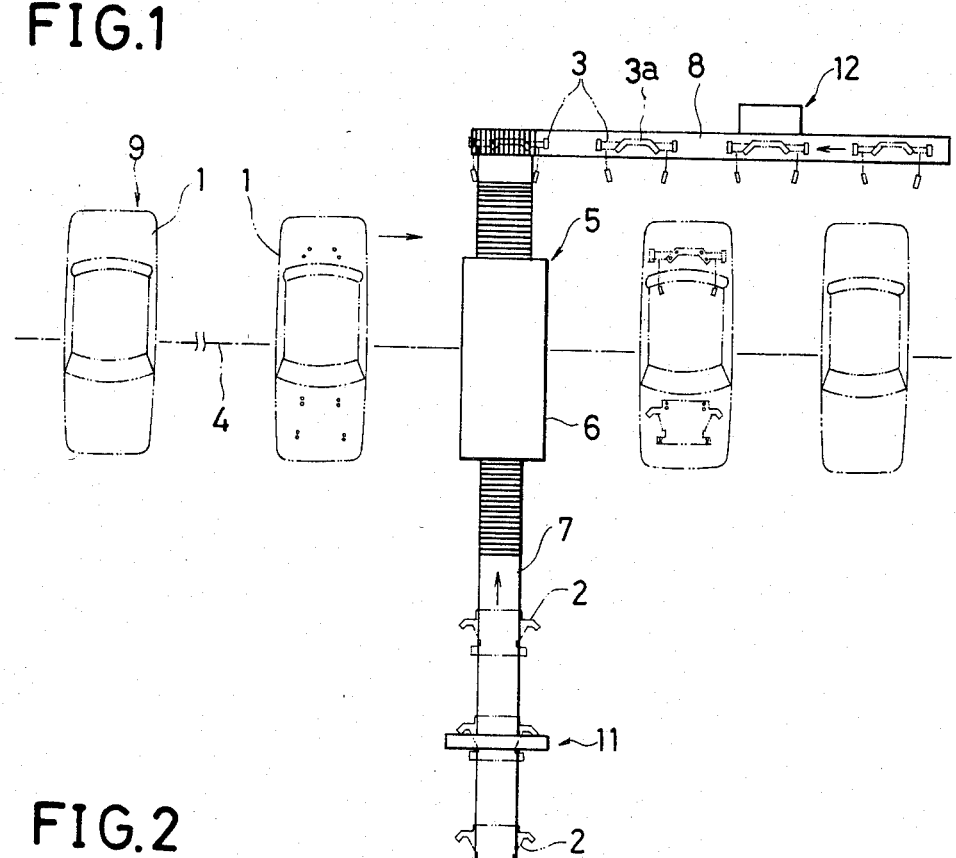
FIG. 1 is a plan view of a vehicle assembly line utilizing the process and apparatus of the invention.

The preferred embodiment will now be described with reference to the accompanying drawings wherein like reference numerals refer to like parts.

With reference to FIG. 1, there is shown a plurality of vehicle bodies 1 conveyed by means of a hanger or the like along an assembly line 4 to a station 5 where front and rear suspension sub-assemblies respectively designated by the reference numerals 2 and 3 are assembled or attached thereto by an assembling jig 6 working from below the vehicle bodies.

Figure 9:
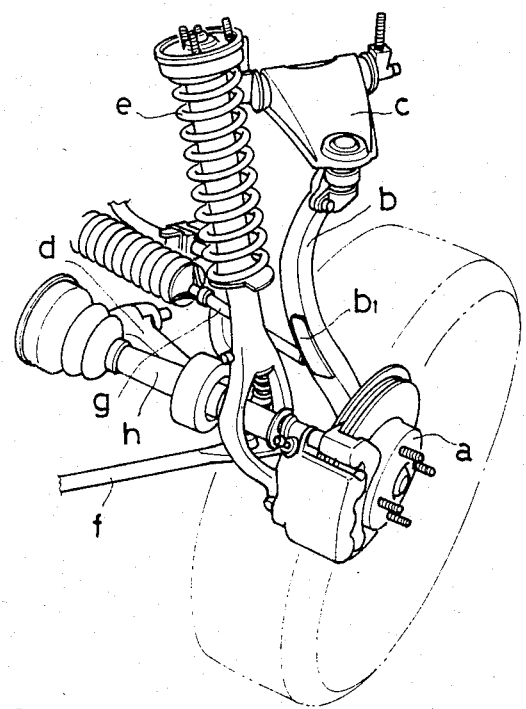
FIG. 9 is a perspective view of one side portion of a front suspension.
Figure 10:
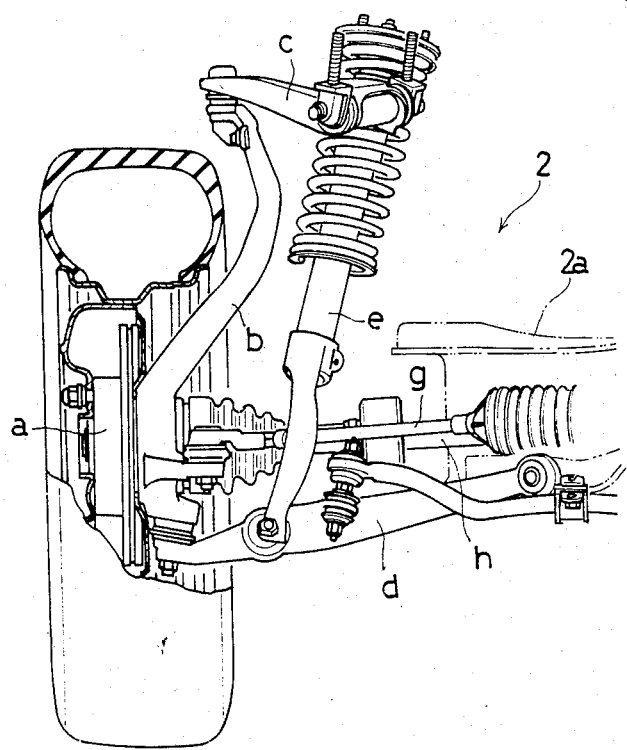
FIG. 10 is a rear view of the front suspension of FIG. 9.

The front suspension sub-assembly 2, is comprised of left and right wheel mounting elements such as disc brake rotors resiliently supported by suspensioncomponents for movement relative to and at opposite ends of a subsidiary frame 2a which also supports the vehicle engine E. The suspension components at one end of the subsidiary frame 2a, as best shown by FIGS. 9 and 10, provide a double wishbone type of suspension having a knuckle arm b supporting a disc rotor a, and an upper arm c and a hower arm d disposed on upper and lower portions of the knuckle arm b. A cushion or resilient strut unit e and a radius rod f also constitute component parts of the suspension. With the exception of the upper arm c, which is attached to the vehicle body 1, the foregoing suspension components, the engine E, a steering mechanism including a tie rod g and a drive shaft h are all provided as part of the front suspension sub-assembly 2 with the components other than the engine and steering mechanism being substantially the same at each end of the subsiding frame 2a.

Figure 11:
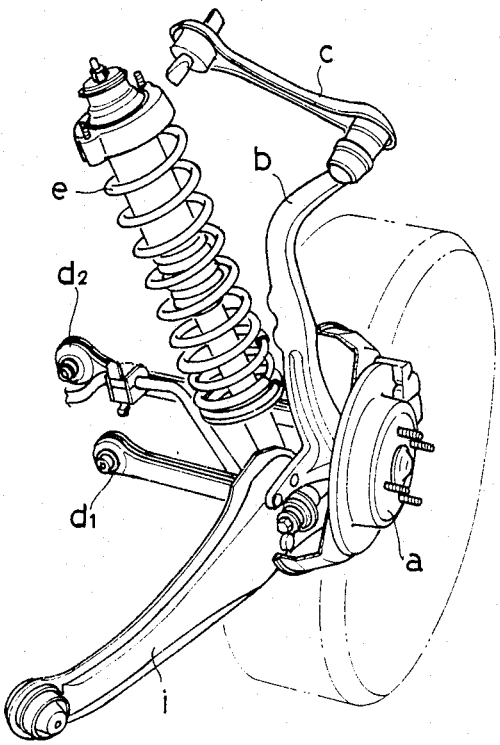
FIG. 11 is a perspective view of one side portion of a rear suspension.
Figure 12:
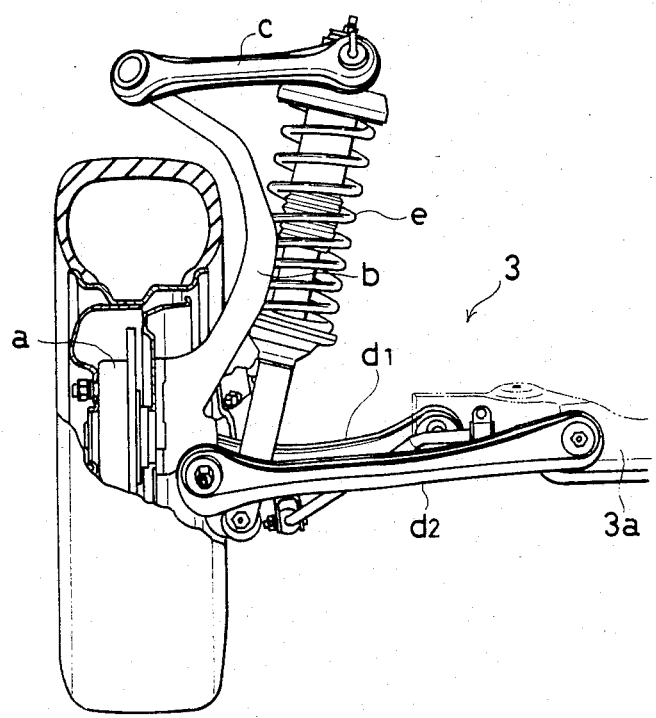
FIG. 12 is a rear view of the rear suspension of FIG. 11.

The rear suspension is also a double wishbone suspension comprised of left and right wheel mounting by suspension components for movement relative to and at opposite ends of a subsidiary frame 3a adapted to be attached with bolts to the rear portion of a vehicle body 1. The suspension components at one end of the subsidiary frame 3a, as best shown by FIGS. 11 and 12 comprise a knuckle arm b supporting a disc rotor a, an upper arm c and a pair of lower arms $d_1$, $d_2$ disposed on upper and lower portions thereof, a cushion or resilient strut unit end and a trailing arm i. The rear suspension sub-assembly 3 is so constructed that the foregoing suspension component members with the exception of the upper arm c, which constitutes part of the vehicle body are provided at each end of the subsidiary frame 3a.

The suspension sub-assembly 2, 3 are provided to the assembling jig 6 by respective suspension conveyors 7 and 8 and assembled to a vehicle body 1 by the jig 6. The subsidiary frames 2a, 3a are bolted to the vehicle body 1 at predetermined positions. Each bolt insertion opening made in each of the subsidiary frames 2a and 3a is made comparatively large in diameter to provide an allowance for displacement of the subsidiary frame from a reference position relative to an attaching opening made in the vehicle body 1 so that each of the subsidiary frames 2a and 3a may be bolted and attached to the vehicle body 1 at or in a position that has been calculated relative to a reference opening in the vehicle body 1.

As previously described the upper arms c are attached to the vehicle body 1 and aserve as means receiving and securing the upper end of the knuckle arms b. If the arms c are attached in a position that is deviated or dislocated from a preferred reference position, even if each of the subsidiary frames 2a and 3a are attached at their respective desired reference positions an error in wheel alignment will result when the suspension subassemblies are assembled to the vehicle body.

A measuring station 9 is provided on the vehicle body assembly line 4 prior to the assembling station 5 to prevent such an undesirable error in wheel alignment during assembly.

Figure 2:
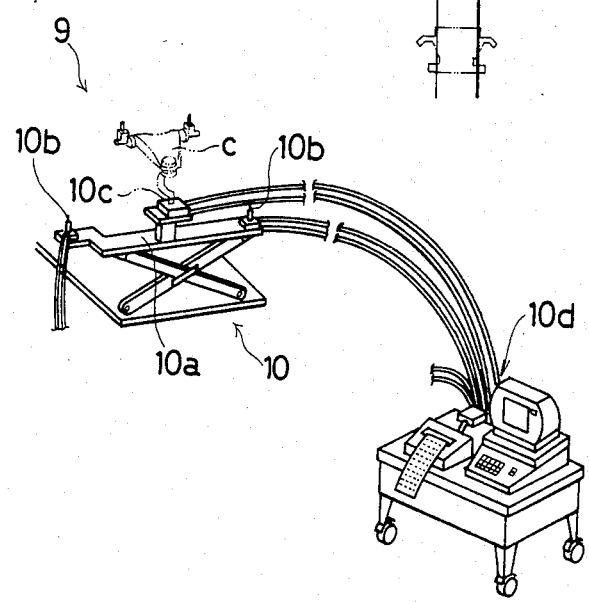
FIG. 2 is a perspective view of a measuring means provided at a measuring station in the assembly line of FIG. 1.

At station 9, there are disposed a pair of right and left measuring means 10 fo a front suspension, each of which is so constructed to include, a shown in FIG. 2, two pins 10b for insertion into left and right subsidiary frame attaching openings of the vehicle body 1 and an engaging member 10c for engaging the knuckle joint portion of the upper arm c previously attached to the vehicle body. The pins 10b and engaging member 10c are provided on an elevating frame 10a and are individually movable in two directions crossing at right angles one with the other.

Similarly, there are disposed a pair of right and left measuring means (not illustrated) for the rear suspension, each of which has the same construction as the measuring means for the front suspension so that the relative location and movement of the pins 10b, 10b and the engaging member 10c may be provided to a computer 10d for detecting respective deviations of he rear suspension subsidiary frame attaching openings of the vehicle body and the upper arm c from their respective reference positions.

Alignment adjustment stations 11 and 12 are respectively provided in the suspension sub-assembly conveyor lines 7, 8 so that an alignment adjustment of each suspension sub-assembly may be performed, if necessary, based on the deviation provided by the computer 10d.

Figure 3:
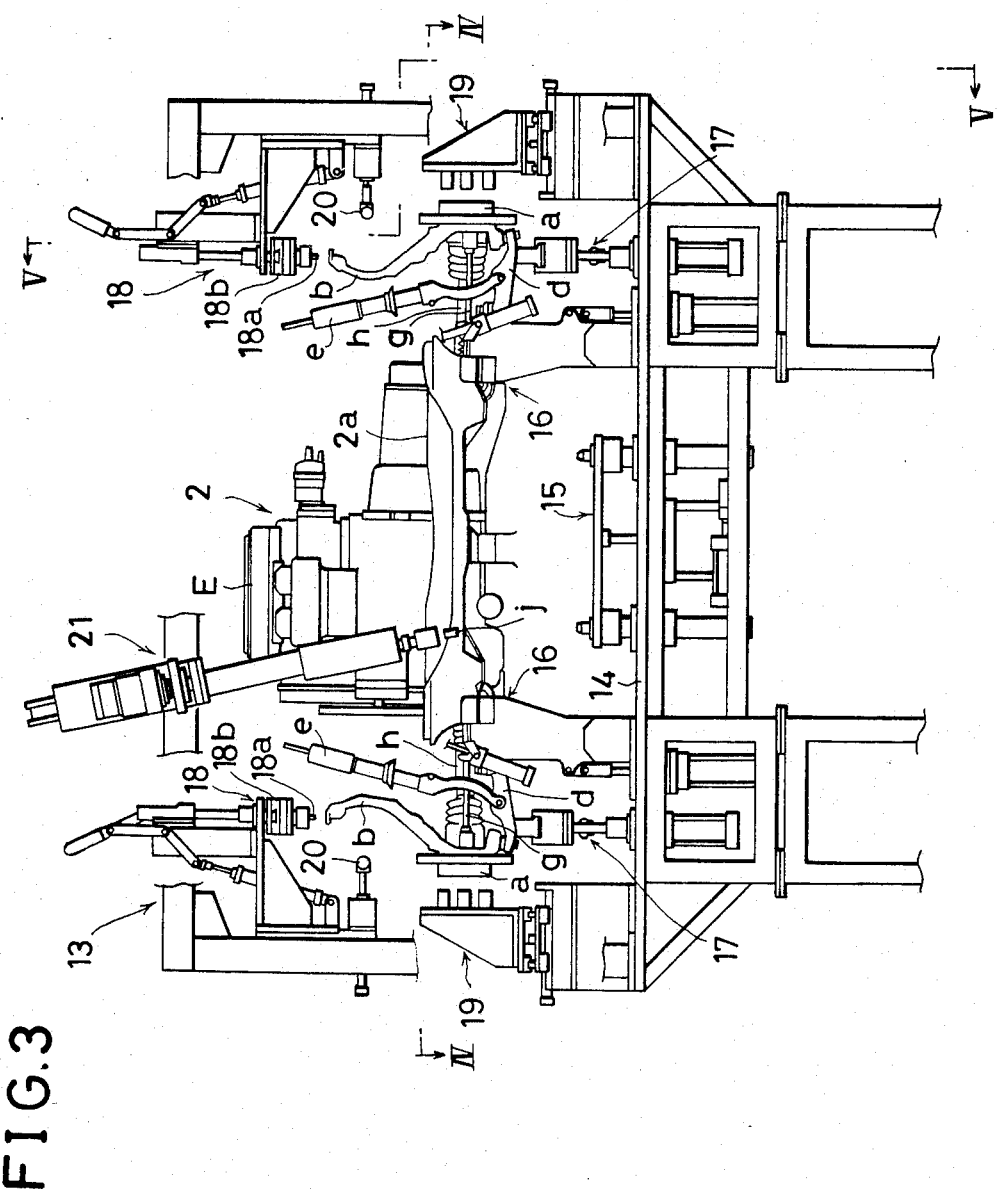
FIG. 3 is a front view of an adjustment apparatus provided at an alignment adjustment station in the assembly line of FIG. 1.
Figure 4:
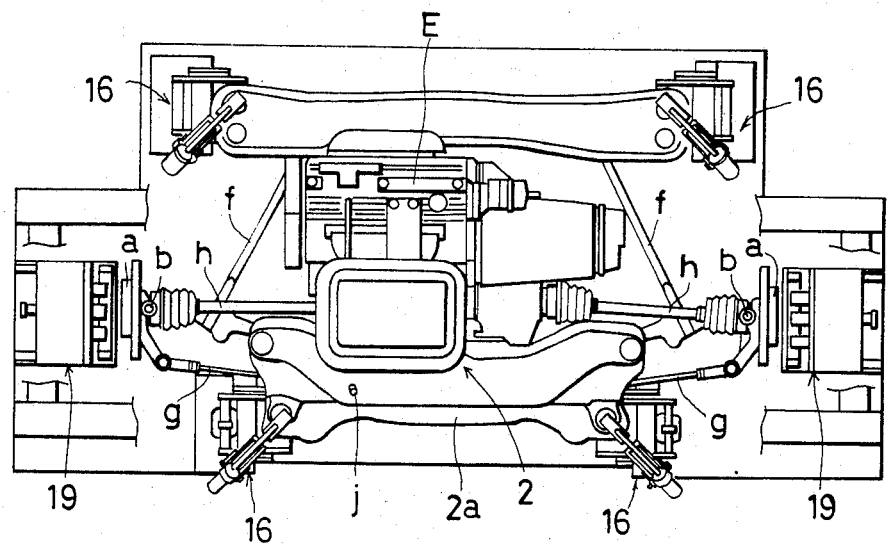
FIG. 4 is a top plan view of the adjustment apparatus as viewed on the line IV—IV of FIG. 3.
Figure 5:
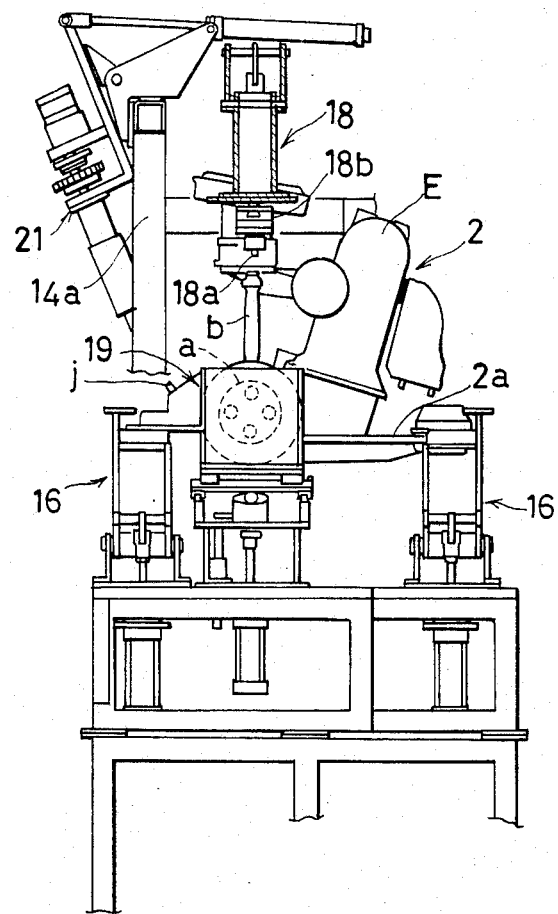
FIG. 5 is a side view taken along the line V—V of FIG. 3.

At the alignment adjustment station 11 on the front suspension conveyor 7, there is provided an alignment adjustment apparatus 13 as shown in FIGS. 3-5.

The alignment adjusting apparatus 13 is constructed on a machine base 14 on which there is provided a lifter 15 for lifting a suspension sub-assembly 2 conveyed thereto and four clamp means 15 situated at the front and rear, left and right corner positions of the subsidiary frame 2a for holding the lifted sub-assembly 2 in a predetermined position. A pair of left and right knuckle supporting means 17 are also provided for movement into abutment with the respective lower arms d to push the arms d upward and thereby support the respective knuckle arms b, in relation to the subsidiary frame 2a, at the same swung movement position as will be obtained when the sub-assembly is assembled to the vehicle body. A pair of left and right knuckle positioning means 18 are also provided with each having an engaging member 18a for insertion from above into and in engagement with the joint portion at the upper end of each knuckle arm b.

Each engaging member 18a is arranged to be adjustable in position to correspond to the position of the member 10c engaging the upper arm c attached to the vehicle body at station 9 by means of a cross slider 18b. Thus, by the knuckle supporting means 17 and the knuckle positioning means 18, the knuckle arm b may be held relative to the subsidiary frame 2a at the alignment adjusting station 1 in the same position as will be obtained when the suspension sub-assembly is actually assembled to the vehicle body. The knuckle support 17 and positioning means 18 thus provide simulation means for setting the suspension components in the same position relative to the subsidiary frame that they would assume if actually attached to the vehicle body.

Additionally, there are also provided on the machine base 14, a pair of first detecting means 19, 19 for detecting toe and camber, a pair of second detecting means 20, 20 for detecting caster, and a steering positioning means 21 for detecting a neutral position of the foregoing steering mechanism and serving to keep the same at the neutral position. The detecting means 19, 19 are located to face the left and right disc rotors a, a and the detecting means 20, 20 are located to face the left and right knuckle arms b, b.

Figure 6:
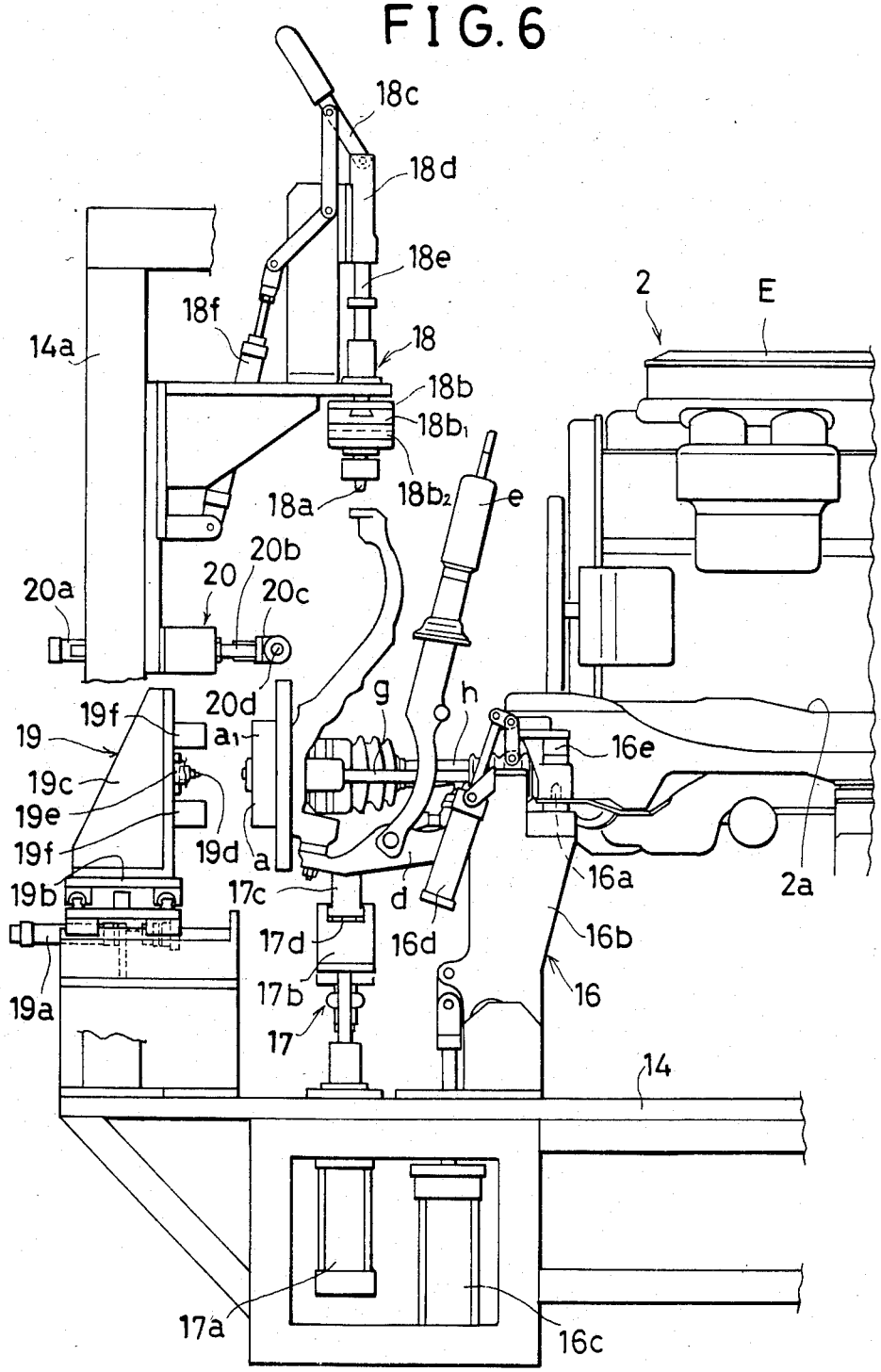
FIG. 6 is an enlarged front view of an important part of the adjustment apparatus of FIG. 3.
Figure 7:
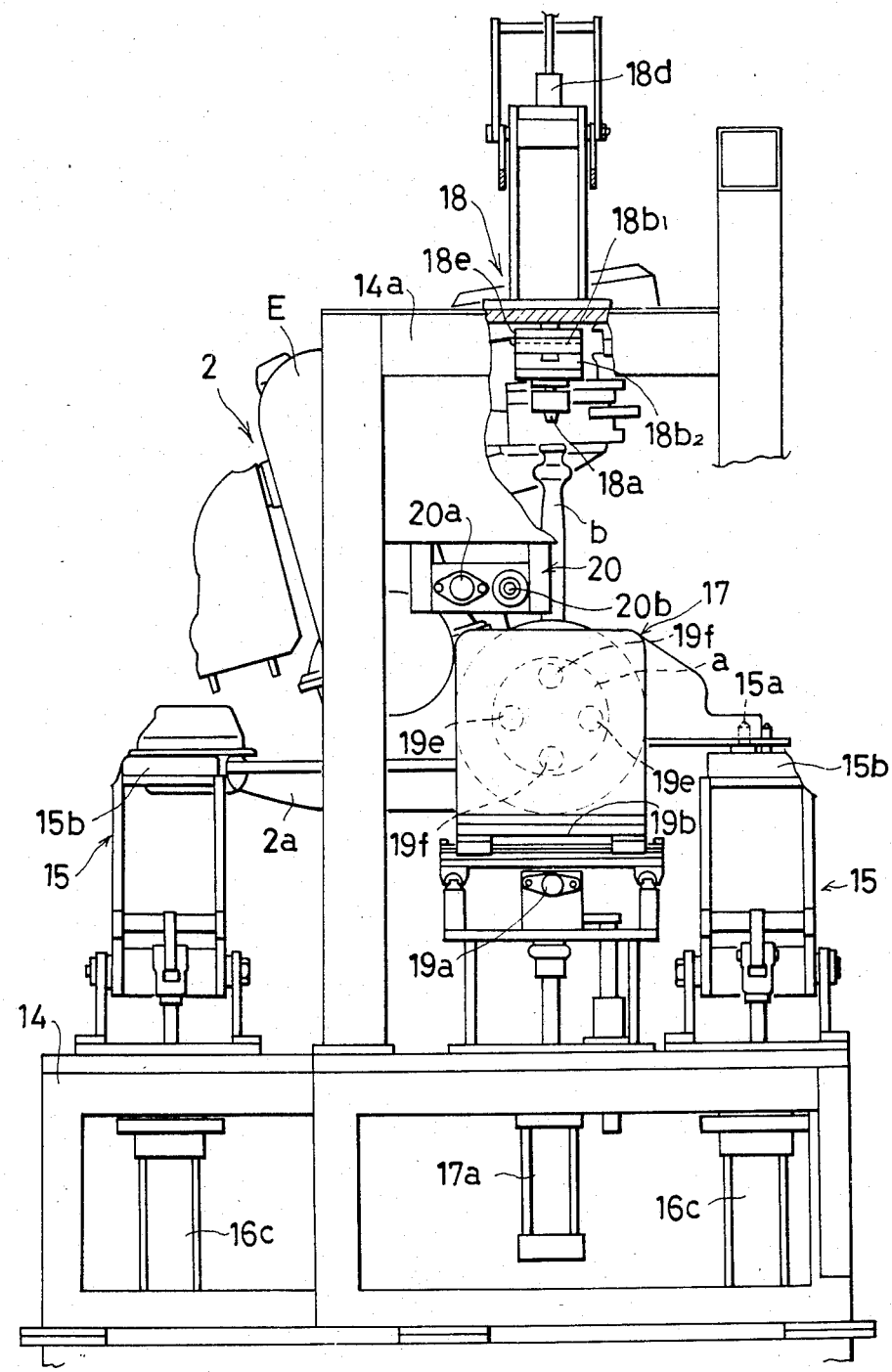
FIG. 7 is a side view, partly in section, of the adjustment apparatus of FIG. 6.

The alignment adjusting apparatus 13 will be explained in greater detail with reference to FIGS. 6 and 7.

Each of the clamp means 16 is constructed with a receiving seat 16b having a positioning pin 16a for the subsidiary frame 2a and is vertically movable by a cylinder 16c. A clamp arm 16e is arranged to be moved by a cylinder 16d attached to the receiving seat 16b. The clamp means 16 is operated in such a manner that, when the sub-assembly 2 is raised by the lifter 15, the receiving seats 16b are raised to receive the subsidiary frame 2a and the lifter 15 is then lowered. Thereafter the clamp arm 16e is closed to hold the subsidiary frame 2a at the predetermined position.

The knuckle supporting means 17 on each side of the apparatus 13 is constructed with a guide block 17b which is vertically movable by cylinder 17a and an abutment seat 7c on the guide block 17b which is moved into abutment withthe lower surface of the lower arm d. The guide block 17b is movable in the front and rear directions by means of a bearing 17d.

The knuckle positioning means 18 on each side of the apparatus 13 is so constructed that a machine frame 14a vertically provided ont eh machine base 14 is provided with a slider 18d which is movable downwards to a predetermined position by operation of a toggle lever 18c. The engaging member 18a is attached through the cross slider 18b, which comprises a first movable member 18b$_1$ movable for adjustment in the front and rear directions and a second movable member 18b$_2$ movable for adjustment in the left and right directions, to the lower end of a rod 18e extending vertically downward from the slider 18d so the position of the engaging member 18 may be adjustable by the cross slider 18b to the front, rear, left or right. The cylinder 18f is used to move the slider 18d upward.

The foregoing first detecting means 19 on each side of the suspension sub-assembly 2 is constructed with a detecting head 19c facing the disc rotor a and supported on a slide base 10b which is movable to advance and retreat relative to the disc rotor a by the cylinder 19a. A centering pin 19d is provided for contacting the center of the disc rotor a, and thereby locating the detecting means 19 relative thereto. A pair of front and rrear toe detecting elements 19e, 19e, each comprising a noncontact type distance sensor, and a pair of upper and lower camber detecting elements 19f, 19f each also comprising a noncontact type distance sensor, are attached to the head 19c. With this arrangement, when the head 19c is properly located relative to the disc rotor a by the centering pin 19d, the distance in relation to a wheel attaching standard surface a$_1$ of the rotor a may be measured by each element 19e and 19e, and thereby the toe may be calculated from the difference between the measured values obtained by the pair of detecting elements 19e and 19e, and the camber may be calculated from the difference between the measured values obtained by the pair of camber detecting elements 19f and 19f.

The second detecting means 20 on each side of the suspension sub-assembly 2 is so constructed that a caster detecting element 20d comprising a non-contact type distance sensor is attached to a detecting head 20c which is movable to advance and retreat toward and away from a positon facing a caster measuring surface b$_1$ (shown in FIG. 9) on the front side of the knuckle arm b. The element 20d is moved by a cylinder 20a and a guide bar 20b that the distance from the element 20d to the measuring surface measured by the detecting element 20d, and the caster may be calculated from this measured distance.

Figure 8:
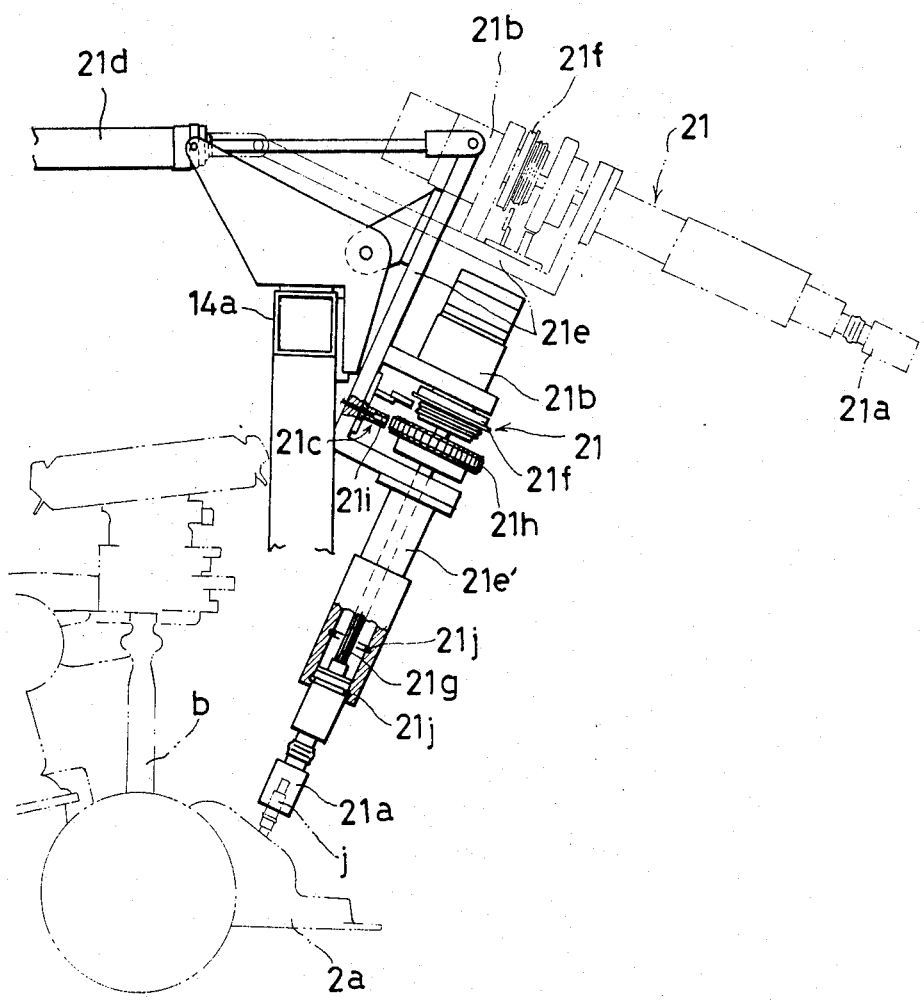
FIG. 8 is an enlarged side view of a steering positioning apparatus.

The steering positioning means 21, as best shown in FIG. 8, comprises a socket 21a for engaging a pinion shaft j provided on the input side of a steering mechanism which projects from a rear beam of the subsidiary frame 2a. A motor 21b for turning the socket 21a in clockwise and counter-clockwise directions, and a detecting device 21c for detecting the turning angle of the socket 21a.

The steering positioning means 21 is supported on the machine frame 14a by swingable frame 21e which is pivotally movable between an upper escaped position as shown by phantom lines and a lower operative position by a cylinder 21d. The motor 21b with a reduction gear is mounted on the swingable frame 21e, and a spline shaft 21g connected through a torque-limiter 21f to the motor 21b extends downward through a guide sleeve 21e' depending from the swingable frame 21e. The socket 21a is so connected to the lower end of the shaft 21g as to be movable upwards and downwards. A gear 21h having teeth which are equal in number to the serrations of the pinion shaft j is attached to an upper end portion of the shaft 21g, and an approximation switch 21i is attached to the swingable frame 21e facing the circumferential surface and teeth of the gear 21h. The approximation switch 21i constitutes the above mentioned detecting device 21c since the number of the teeth of the gear 21h passing across the front surface of the switch 21i may be counted by a counter connected to the switch 21i, and the turning angle of the socket 21a may be detected as a function of the number of teeth which have passed the switch 21i in each turning cycle.

Two spaced sets of lock rings 21j are provided on the lower end portion of the guide sleeve 21e' so that the socket 21a may be selectively retained resiliently at an upper and lower position by the rings 21j, 21j. The socket 21a may thus be selectively brought into engagement with the pinon shaft j when moved downwards manually to its lower position.

The process for adjusting alignment of a suspension subassembly using the alignment adjustment apparatus 13 will now be explained.

First, the subsidiary frame 2a of the sub-assembly 2 is lifted up by the lifter 15 and is held at a predetermined position by the clamp means 16. The knuckle arm b on each side is then pushed upward by each knuckle supporting means 17, to its swung position, that is, the same position the knuckle arms b will take when the suspension sub-assembly is actually assembled to and supports a vehicle body. The engaging member 18a of each knuckle positioning means 18 is lowered by operation of the toggle lever 18c, and is brought into engagement with the joint portion, of the upper end of each knuckle arm b. At this stage, the first movable member 18b$_1$ and/or the second movable member 18b$_2$ of the cross slider 18b are moved for adjustment in accordance with any deviation to the front, rear, left and/or right of the attaching position of the upper arm c to the vehicle body from a reference position, that has been previously detected by the measuring means 10. The positional relationship of the engaging member 18a with knuckle arm b of the suspension subassembly 2 is set equal to the positional relationship which would result if the suspension sub-assembly 2 were attached to the knuckle joint portion of the upper arm c attached to he vehicle body 1.

In this manner, the knuckle arm b constituting one of the suspension component members is held at the same position in relation to the subsidiary frame 2a, as that which will be obtained at the time of actually attaching or assembling the frame 2a to the vehicle body 1. Thereafter, the neutral position of the steering mechanism is detected by the steering positioning means 21 and the steering mechansim is set in this neutral position.

Detecting and setting the neutral position of the steering mechanism is carried out as described hereafter. The socket 21a is brought into engagement with the pinion shaft j, and by operation of the motor 21b, the socket 21a is rotated in one direction to a locked position where the shaft j is locked by movement of a rack of the steering mechanism to the end of its stroke on one side, and thereafter the socket 21a is rotated in the opposite direction to a locked position where the shaft j is locked by movement of the rack to the end of its stroke on that side. A maximum turning angle $\theta$ of the socket 21a between the two locked positions is detected by the detecting device 21c and then, the socket 21a may then be turned ineither direction by $\theta/2$ from the locked position on either side by control means (not illustrated) for the motor 21b.

When the full turning range of the pinion shaft j is detected from the movement or passage of the teeth of the gear 21h by the detecting device 21c, and when the socket 21a is turned in reverse by $\theta/2$ as described above, if the serrations of the shaft j are not positioned at a predetermined angular setting which is connectable to the steering shaft with the steering wheel being set in a straight forward running position, the socket 21a is turned further within the range of no more than one pitch of the serrations, and when the serrations assume the foregoing predetermined angular setting, the turning of the socket 21a is stopped, and this position is set as the neutral position of the steering mechanism.

Thereafter, the toe, the camber and the caster of the left and right wheels are detected by the first and second detecting means 19, 20, and the toe adjustment is carried out by expansion and/or contraction of the tie rods g so that the toes of the left and right wheels may be made equal one to another, and the adjustment of the camber and the caster are carried out by adjustments of the lower arm d and the radius rod f.

If the deviation of the subsidiary frame attaching openings of the vehicle body 1 from the preferred reference position becomes so large that proper adjustment cannot be acommodated with the large diameter bolt insertion openings of the subsidiary frame 2a, the subsidiary frame 2a cannot be attached to the vehicle body 1 at its preferred reference position. In such a case, the necessary adjustment to properly align the suspension sub-assembly is calculated by the computer 10d on the basis of the position of the engaging member 18a and the deviation of the attaching position of the subsidiary frame 2a, and an alignment adjustment based on the calculated resultant values is carried out.

The alignment adjustment of the front suspension subassemblies 2 at the alignment adjustment station 11 on the front suspension assembly conveyor 7 has been described.

The alignment adjustment apparatus provided at the alignment adjustment station 12 on the rear suspension sub-assembly conveyor 3 is substantially the same as the alignment adjustment apparatus 13 used at the station 11 except for the elimination of the steering positioning means 21. At the station 12 the knuckle arm b of the rear suspension sub-assembly 3 is set in position in accordance with such a deviation of the attached position of the rear upper arm c to the vehicle body 1 from a reference position that has been measured at the vehicle body measuring station 9, so that an alignment adjustment may correct any such deviation.

The front and rear suspension sub-assemblies 2, 3 provided with what ever alignment adjustments as may have been required as described above are then conveyed into the assembling station 5 and are attached or assembled to the vehicle body 1. The above described process and apparatus thus eliminates the need for alignment adjustmenst after the vehicle has been completely assembled. Moreover, since the steering mechanism is set in its neutral position with the steering shaft and wheel set in its straight forward running position when they are connected to the pinion shaft j, the left and right steering angles of the wheel are equal, and there is no need for a steering angle adjustment after the vehicle has been completely assembled.

With vehicle bodies manufactured from the same press lot, there is relatively little change or deviation in the attaching position of the upper arm c from the desired reference position. When, however, the manufacture of vehicles includes vehicle bodies from different press lots, this causes a varied dispersion in the attaching position of the upper arm c and it is necessary that measuring at the measuring station 9 and the adjustments at the alignment adjustment stations 11, 12 are carried out as described above.

Thus, according to this invention, prior to attaching of the suspension sub-assembly to the vehicle body the deviation of the suspension attaching position of the vehicle body from a reference position is measured, and an alignment adjustment of the suspension sub-assembly that takes this deviation into account is carried out, and thereafter the sub-assembly thus adjusted in wheel alignment is assembled to the vehicle body, so that is becomes unnecessary to adjust the wheel alignment after the vehicle has been completely assembled.

What is claimed is:

1. A process for adjusting alignment of a suspension sub-assembly having a pair of wheel mounting elements suspended from a subsidiary frame relative to a vehicle body which includes means thereon for attaching said sub-assembly thereto comprising the steps of:
    measuring the position of said means on said vehicle body for attaching said sub-assembly to said vehicle body,
    detecting the extent to which said means for attaching said sub-assembly deviates from a reference position for said means for attaching said sub-assembly to said vehicle body,
    mounting said suspension sub-assembly to apparatus adapted to hold said suspension sub-assembly with said wheel mounting elements oriented the same as though said suspension sub-assembly were attached to said vehicle body, and
    adjusting the orientation of said wheel mounting elements relative to said subsidiary frame to compensate for the extent to which said means for attaching said sub-assembly deviates from said reference position whereby the wheel mounting elements of the adjusted sub-assembly will have a predetermined orientation relative to the vehicle body when the sub-assembly is attached to said vehicle body.

2. The process for adjusting alignment of a suspension subassembly as defined by claim 1 wherein said wheel mounting elements are suspended from said subsidiary frame by components permitting controlled resilient movement relative to said subsidiary frame and including adjusting the position of said components relative to said subsidiary frame to compensate for the extent to which said means for attaching said sub-assembly deviates from said reference position.

3. The process for adjusting alignment of a suspension subassembly as defined by claim 2 wherein said subassembly includes a steering mechanism and including detecting a neutral position of said steering mechanism and maintaining said steering mechanism at said neutral position during said adjusting of the position of said components relative to said subsidiary frame.

* * * * *

UNITED STATES PATENT AND TRADEMARK OFFICE
CERTIFICATE OF CORRECTION

PATENT NO. : 4,805,286
DATED : February 21, 1989
INVENTOR(S) : Kuninobu UCHIDA et al It is certified that error appears in the above-identified patent and that said Letters Patent is hereby corrected as shown below:

```
On the cover page, Item [30], the following should also appear:
   --Jun. 30, 1986 [JP]   Japan ...................... 61-151736
     Jun. 30, 1986 [JP]   Japan ...................... 61-99034--.
```

Signed and Sealed this

Third Day of October, 1989

Attest:

DONALD J. QUIGG

Attesting Officer

Commissioner of Patents and Trademarks